United States Patent [19]

von Holten et al.

[11] Patent Number: 4,503,291
[45] Date of Patent: Mar. 5, 1985

[54] REPERTORY DIALER WITH EFFICIENT DATA STORAGE

[75] Inventors: Ernest von Holten, Wakefield, Mass.; Robin C. Moseley, Allentown, Pa.

[73] Assignee: DASA Corporation, Andover, Mass.

[21] Appl. No.: 619,401

[22] Filed: Jun. 12, 1984

Related U.S. Application Data

[63] Continuation of Ser. No. 441,037, Nov. 12, 1982, abandoned.

[51] Int. Cl.³ .............................................. H04M 1/26
[52] U.S. Cl. .............................. 179/90 AN; 179/90 B; 340/347 DD
[58] Field of Search ............ 179/90 AN, 90 B, 90 BB, 179/90 BD; 364/900; 340/347 DD

[56] References Cited

U.S. PATENT DOCUMENTS 3,111,648 11/1963 Marsh et al. ................ 340/347 DD
4,141,005 2/1979 Bonner et al. ............... 340/347 DD Primary Examiner—Stafford D. Schreyer
Attorney, Agent, or Firm—Lowe, King, Price & Becker

[57] ABSTRACT

Method and apparatus are provided for microprocessor controlled storage and dialing of telephone numbers and storage and access of associated data. Each entry includes a telephone number field and an associated data field. The two fields are differently encoded and thus enhance the storage efficiency by avoiding a requirement for field terminating characters. An operator provides particular entries which are matched with stored fields of associated data. Upon determining a match, the stored associated data is displayed and the associated telephone number may be automatically dialed. A three chip microprocessor set scans a keyboard, controls displays, and communicates with program and data storage units. The microprocessor is used in conjunction with integrated circuitry to detect the existence of a dial tone for a predetermined time. Multifrequency or pulse dialing of a number from storage may be effected by the inventive dialer. An interface circuit includes muting circuitry for either multifrequency tones or pulses. A power supply circuit includes a trickle charging circuit for battery backup and circuitry to prevent access to, and alteration of, memory storage in the event of power failure. An audio circuit includes directional coupling to minimize audio feedback in a speakerphone mode of operation.

21 Claims, 9 Drawing Figures

REPERTORY DIALER WITH EFFICIENT DATA STORAGE

This application is a continuation of application Ser. No. 441,037, filed Nov. 12, 1982, now abandoned.

BACKGROUND OF THE INVENTION

This invention relates to repertory dialers, and more particularly to microprocessor controlled repertory dialers including a storage facility for data associated with stored telephone numbers to be automatically dialed upon command, wherein a telephone number field is encoded in a first code, and data stored in a field for associated-data is encoded in a second code.

Prior art devices for storing telephone numbers and names associated therewith, according to an alphabetic hierarchy of the names, are disclosed in Hagelberger et al U.S. Pat. No. 3,242,470. Similarly, Fujimura U.S. Pat. No. 4,104,717 provides a telephone information retrieval system in which each entry includes name, address and other information, while Roberts No. 4,118,788 discloses associated retrieval data, such as a telephone directory listing of numbers, along with names, addresses and the like.

Auto-dialing circuits are known as described at Hestad et al U.S. Pat. No. 4,232,200, and Lake et al U.S. Pat. No. 4,178,487.

However, none of the prior art discloses a combination in which a telephone number is stored along with associated search data, in which the search data may be displayed and the telephone number automatically dialed at the option of an operator.

Particularly, none of the known prior art provides efficient storage of variable length fields of telephone numbers and associated data in which terminating characters are not required between the fields.

It is accordingly a primary object of the present invention to provide a microprocessor controlled repertory dialer having efficient data storage, and a method for operating such a dialer.

It is a more specific object of the invention to provide a repertory dialer in which variable length fields of telephone numbers and associated data are provided, without requiring the use of separating or terminating characters between such fields.

Still a further object of the invention is the provision of a repertory dialer in which a multichip microprocessor is utilized in order efficiently to store data, to access and search such data, to display the data and to dial a telephone number for accessing that telephone circuit.

Still another object of the invention is the provision of a power supply for a repertory dialer, in which a backup battery is provided along with charging means therefor, and circuitry for connecting the battery to the dialer when the primary source of power fails.

Yet a further object of the invention is the provision of a repertory dialer having memory safety circuits for disabling alteration of data stored in the memory upon failure of externally supplied voltage thereto.

SUMMARY AND OBJECTS OF THE INVENTION

In accordance with these and other objects of the invention, a repertory dialer is provided including a programmable microcomputer controller. A dialing circuit is connected to the microcomputer for providing dialing signals to a telephone circuit. An input device is used to input telephone number data and associated search data, as well as control signals, to the programmable microcomputer which causes storage of the input data in a storage device. Additional circuitry is provided for enabling storage of variable length, alternating fields of telephone-numbers and associated-search data in consecutive portions of the storage without requiring the use of separating characters therebetween. A display is provided for displaying various ones of the stored data, and a second storage provided for storing a control program for the microcomputer. In accordance with the control program, the microcomputer responds to an input control signal by storing various data in the storage, and further by accessing particular data in response to a second input control signal and to particular input search information. A method for operating the dialer is also provided.

In accordance with a further feature of the invention, a common bus is provided in the microcomputer circuitry for connecting the microcomputer controller, the storage devices, and the display.

In accordance with a further aspect of the invention, the microcomputer includes a microprocessor, an input/output port connected to the common bus for expanding the number of control lines connectable to the microprocessor, and a memory interface for interfacing the microprocessor to the two storage devices.

In accordance with yet another aspect of the invention, a power supply is provided for the microcomputer controlled repertory dialer, including first and second power supply devices. The first supply device converts external voltage to appropriate voltage levels for operation of the dialer, and the second supply includes a battery and a charger therefor. Additionally, circuitry is provided for connecting the first supply to the data storage when externally supplied voltage is available, and for connecting the battery to the data storage when externally supplied voltage is not available, thus to retain stored data.

BRIEF DESCRIPTION OF THE DRAWINGS

The foregoing and other objects, features and advantages of the invention will become apparent upon review of the following specification and claims, when viewed in conjunction with the accompanying drawing, in which:

DETAILED DESCRIPTION OF THE PREFERRED EMBODIMENT

Figure 1:
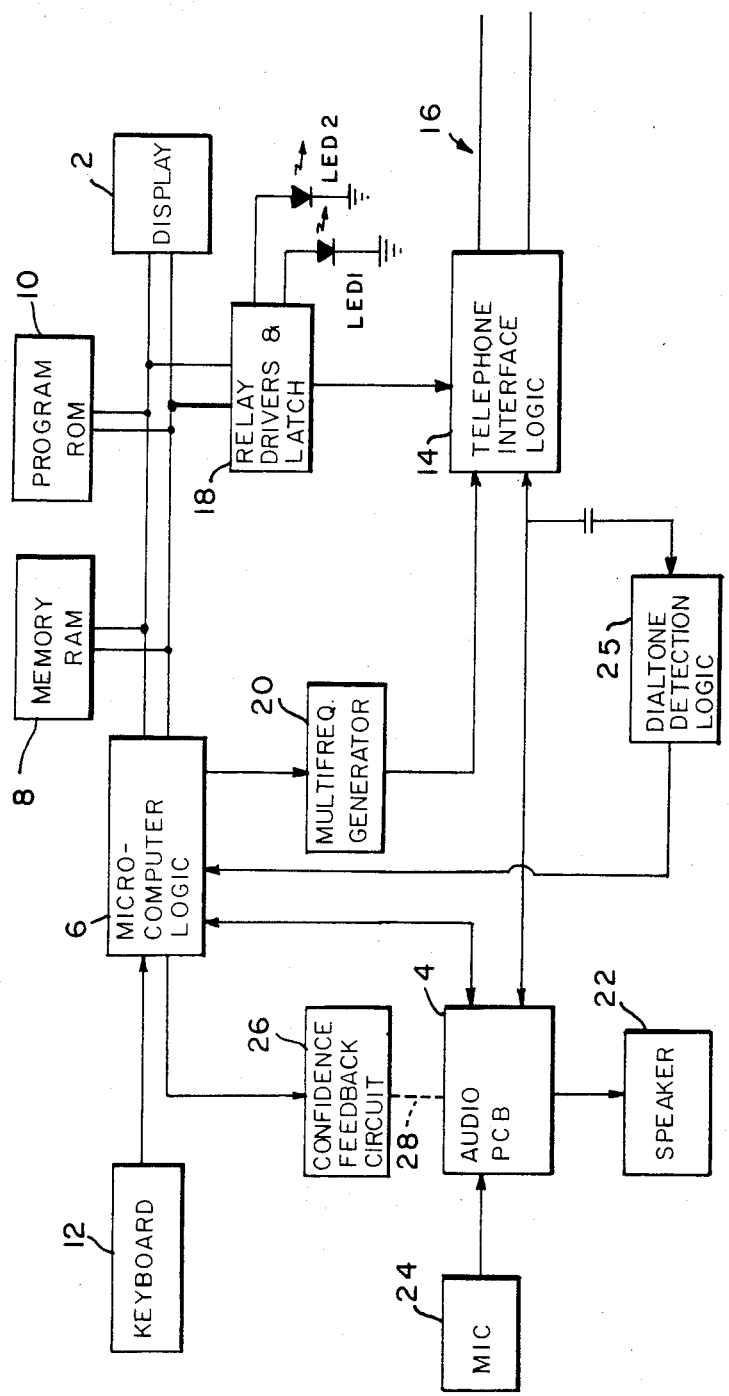
FIG. 1 shows a block diagram of a repertory dialer in accordance with the present invention.

Referring now to FIG. 1, the preferred embodiment of the repertory dialer is shown as a number of functional circuit blocks. Physically, the dialer is comprised of three electrical assemblies, including a main logic circuit board, a display circuit board, and an audio circuit board. In FIG. 1, the display board is shown at 2 and the audio printed circuit board shown at 4. Both of these circuit boards are described in the sequel. The remaining blocks represent the functional circuit components of the main logic board, which is based around a three chip microprocessor set, utilizing a number of the F8 series of chips manufactured by Mostek, for example.

The microprocessor configuration is generally shown as microcomputer logic 6 in the figure, incorporating a microprocessor chip, a static memory interface, and a peripheral input/output chip. Such chips are typically available from Mostek under the numerical designations 3850, 3853, and 3871, for example.

In the configuration of FIG. 1, a memory 8 is used to store telephone numbers of specific individuals, organizations, and the like. Associated with each of the telephone numbers stored in memory 8 is a data field including, for example, names, addresses, dates, identifying information or other data. A control memory 10 is provided for storing the program controlling the microcomputer 6. A keyboard 12 is used to input data to memory 8, as well as to input control signals to microcomputer 6 for acquiring specific data from memory 8. Microcomputer 6 obtains the data for input into memory 8 by scanning keyboard 12 and communicates such data to the memory. Display board 2 includes a number of alpha numeric display fields for displaying the data input by keyboard 12 to memory 8, as well as for displaying data acquired from memory 8 upon an appropriate request by a user, as input to the system on keyboard 12. In both situations, the microcomputer 6 provides the actual signals for display by display board 2.

Other components of the main logic board include a telephone interface logic shown at 14 for forming appropriate dialing signals for telephone lines 16. Both pulse dialing signals and multifrequency ("touch tone") dialing signals are communicated through interface 14 to the telephone lines. A control latch and relay drivers controlled thereby are included at block 18. The latch is responsive to signals output by microcomputer 6 for activating a number of relays in interface logic 14. A multifrequency generator 20, activated by microcomputer 6, provides signals to interface 14 for transmission to telephone lines 16.

In addition to transmission of dialing signals to the telephone lines, interface logic 14 further provides muting functions for a speaker 22, thereby avoiding the reproduction of the dialing signals thereon. Speaker 22 and a microphone 24 form the basic components of a telephone set.

A dial tone detection logic circuit is shown at 25. This circuit is connected to receive telephone line signals from interface logic 14. A filter is used to detect the presence of a signal on the telephone lines 16, and an interrupt sequence causes microcomputer 6 to determine whether or not the line signal represents a dial tone. Upon determining that a dial tone is present for a predetermined time, the microcomputer causes interface logic 14 to generate the appropriate dialing signals to be coupled to the telephone lines 16.

In response to specific control signals, which are input by a user through keyboard 12 to microcomputer 6, "hands-free" operation of the telephone may be effected by selection of a microphone and a speaker, housed within the chassis for the inventive dialer, to form the input and output units of the telephone set. Alternatively, a standard telephone handset, removeable from and connected to the dialer chassis, may provide the input and output signals to and from the telephone lines 16.

A confidence feedback circuit 26 is shown in FIG. 1. The purpose of the circuit is to provide confirmation to the user that data entered by contacting a particular key on keyboard 12 has in fact been received by microcomputer 6. Such feedback circuits are particularly advantageous in systems utilizing keyboards wherein no mechanical movement is experienced by the user. In the presently preferred embodiment, the keyboard 12 is contemplated as incorporating a membrane-type keyboard, having extremely short distances between the switch contacts thereof. Because of the short distances involved, the user does not experience any mechanical movement when using such a keyboard. In order to provide confidence for the user that the contacted key has provided an input signal to the microcomputer, confidence feedback circuit 26 provides either audio, visual, or tactile feedback to the user upon detection of the input by the microcomputer. In the presently preferred embodiment, confidence feedback circuit 26 includes a buzzer for generating an audio tone upon depression of a key in keyboard 12. The audio tone, however, may be generated by the audio circuit of printed circuit board 4, as illustrated by dashed line 28. In such an arrangement, the confidence feedback signal is heard on the speaker 22.

Light emitting diodes LED 1 and LED 2 are provided to give indications to the user when the repertory dialer of the present invention is awaiting a dial tone, or is in the speaker phone ("hands-free") mode, respectively. The microcomputer logic 6 includes a microprocessor 30, programmed to control the LEDs to provide appropriate signals to the user. Thus, LED 1 may be caused to flash at a first rate to indicate that a dial tone has not been detected; to flash at a second, slower, rate when a "timeout" mode has been entered; and to be continuously on when dialing signals are being generated and applied to the telephone lines. LED 2 may be activated whenever a user activated switch is used to select hands free, speaker phone operation. A third LED, described in the sequel, is energized when AC power is applied to the system.

Figure 2:
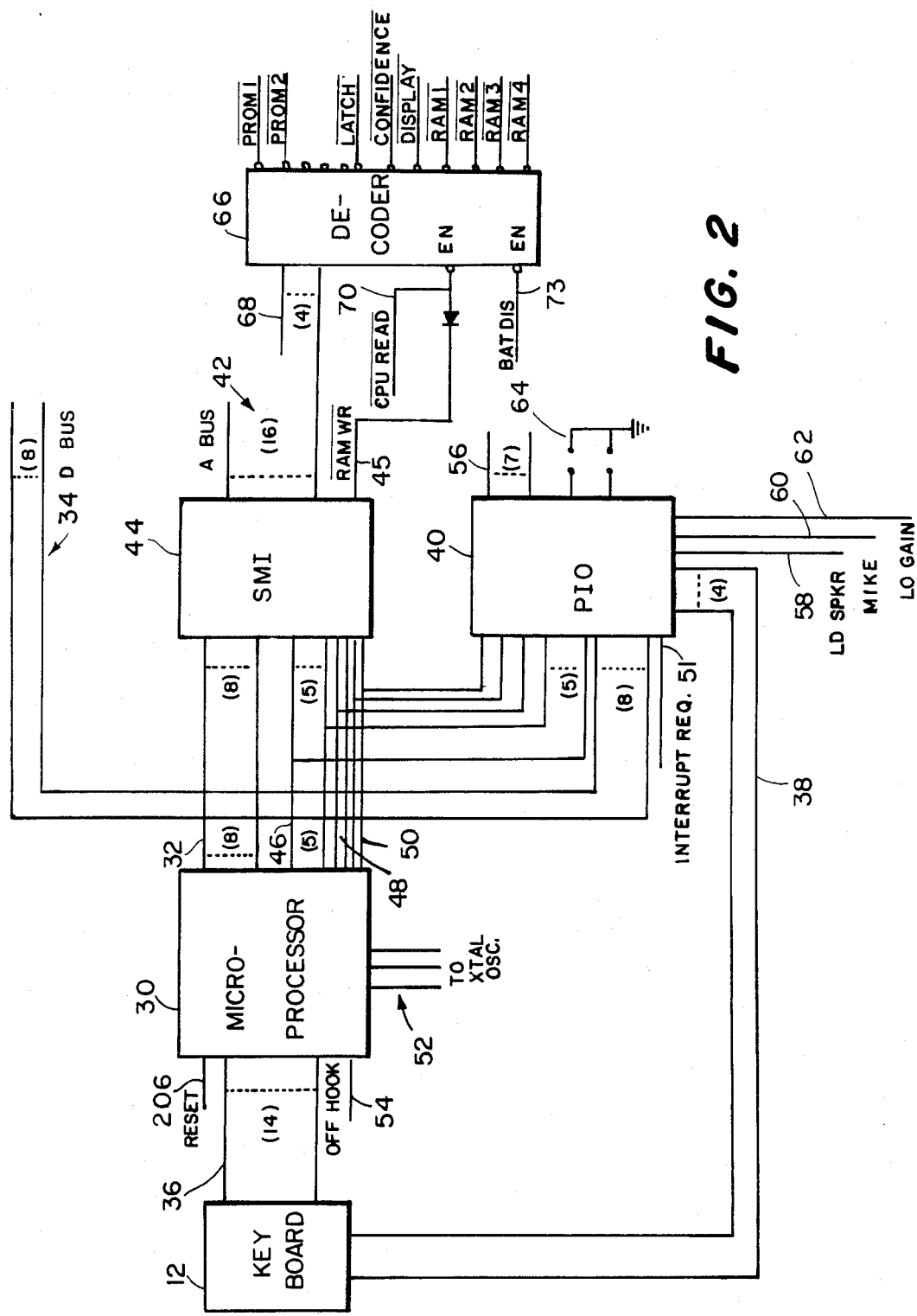
FIG. 2 illustrates details of the microcomputer logic portion of FIG. 1.

Referring now to FIG. 2, the microcomputer logic of block 6 in FIG. 1 is shown in greater detail. Specifically, the three chips utilized to formulate the microcomputer of the present invention, and the manner of providing an address and a data bus for connection to various other components of FIG. 1, are shown in greater detail.

A microprocessor 30, which may be Mostek chip number 3850, for example, includes bidirectional, three-state data lines 32, forming a data bus 34. The microprocessor 30 includes sixteen input/output lines arranged as two eight-bit ports. Fourteen of those lines, shown at 36, are connected to keyboard 12. The keyboard is arranged as a 14 row by 4 column array of input switches. The 14 rows are scanned by microprocessor 30 on lines 36. The 4 columns of the keyboard are, in turn, scanned by 4 input/output lines 38, connected to a peripheral input/output chip shown as PIO 40.

A 16 bit address bus 42 is used to provide communication among microprocessor 30 and memory 8, control memory 10, display 2, and the control latch of block 18. Since the microprocessor includes only eight data output lines 32, addressing on the address bus 42 is provided by microprocessor 30 in a two-step operation. The microprocessor first outputs the lower half, and then the upper half, of an address on data lines 32 to a static memory interface, shown as chip SMI 44, which may be Mostek chip number 3853, for example. The SMI assembles the two halves of the address and outputs the complete address on the 16 bit address bus 42. Additionally, SMI 44 provides a $\overline{\text{RAM WR}}$ signal on line 45 to enable the writing of information into memory 8.

While a single chip microprocessor may be used without a separate external data bus 34, the present embodiment, which includes the data bus, is simpler and less expensive to implement. Specifically, with a keyboard, a display, a memory, and control circuits connected to the microprocessor, a large volume of input/output (I/O) data must be handled. Where all data is communicated via four I/O ports (32 lines), a great many external latches and selectors are required. The number of chips required for a working model is thus greatly increased, as is the production cost, by use of a system without external data and address buses. Accordingly, the presently preferred embodiment includes data bus 34 as well as address bus 42.

Microprocessor 30 is further provided with five output control lines 46 which are input to SMI 44. A pair of output clock lines 48 of microprocessor 30 are similarly input to SMI 44, while an interrupt request line 50, input to microprocessor 30, is connected to receive outputs from SMI 44 and from PIO 40. PIO 40 is itself provided with interrupt requests from other circuits on an interrupt request line 51.

The eight bidirectional data lines 32, the five output control lines 46, the two clock output lines 48, and the interrupt request input line 50 of microprocessor 30 are similarly connected to PIO 40. Finally, a crystal clockline and an external clockline, along with an RC network pin are provided at 52 for the microprocessor 30.

As will be appreciated, microprocessor 30 thus detects key activation on keyboard 12 by scanning the keyboard. In the preferred embodiment, the microprocessor sends out sequential pulses on the various row lines 36, and controls the PIO 40 to detect the pulses on specific column lines 38. Detection of a pulse emitted on a particular one of lines 36 by a specific one of lines 38 thus identifies the intersection of a particular row and column wherein the keyboard switch is closed, thereby identifying the specific key activated by a user. Of course, as is known in the art, the columns may be provided with pulses and the rows may be scanned to detect the pulses output to the columns.

In the presently preferred embodiment, one of the sixteen input/output lines of microprocessor 30, shown at 54, is dedicated to detection of an off-hook condition. Other functions directly controlled by microprocessor 30 and communicated directly rather than on data bus 34 or address bus 42 include multifrequency tone generation for situations in which multifrequency dialing, rather than pulse dialing, is used. Specifically, PIO 40 is provided with two eight bit input/output ports. Seven lines of one of the ports, shown at 56, are used to provide control signals to multifrequency generator 20, shown in FIG. 1. As previously mentioned, four lines of the second input/output port are used to scan keyboard 12, as shown at 38. Three of the remaining lines of the second port are used to provide direct control signals to the audio board 4. These lines, shown at 58, 20, and 62, provide control signals for activating the chassis loudspeaker, the microphone, and for providing low gain, respectively. The remaining two input/output lines, one from each of the two ports of PIO 40, are used to configure the repertory dialer of the present invention to specific environments and conditions by providing "personality" jumpers therefor as shown at 64.

The remaining functions performed by the microprocessor are communicated to the various circuits, including the confidence feedback circuit 26, dial tone detection logic 25, block 18, display 2 and the respective memories, by use of the address and data buses 42 and 34. Such communication is achieved by transmission of 12 bit addresses to memory 8 and to control memory 10, and by transmission of four address bits to a data selector and decoder 66, which receives the four heighest order address bits of address bus 42 and enables one of 16 output lines, as described below.

The decoder receives the four highest order address lines output by SMI 44, and shown at 68. The output lines of decoder 66 are used selectively to enable one of two programmable read only memory chips of control memory 10, the latch in block 18, the confidence circuit 26, display 2, and one of four random memories in memory 8, respectively.

The decoder 66 is in turn enabled by the presence of either a CPU Read signal on line 70, or a $\overline{\text{RAM WR}}$ signal on line 45. Alternatively, in the event of a power supply malfunction and associated loss of power, the decoder is disabled by line 73, in order to assure that no further writing occurs in the memory 8 under insufficient power conditions, thereby insuring the integrity of the information stored in that memory.

Figure 3:
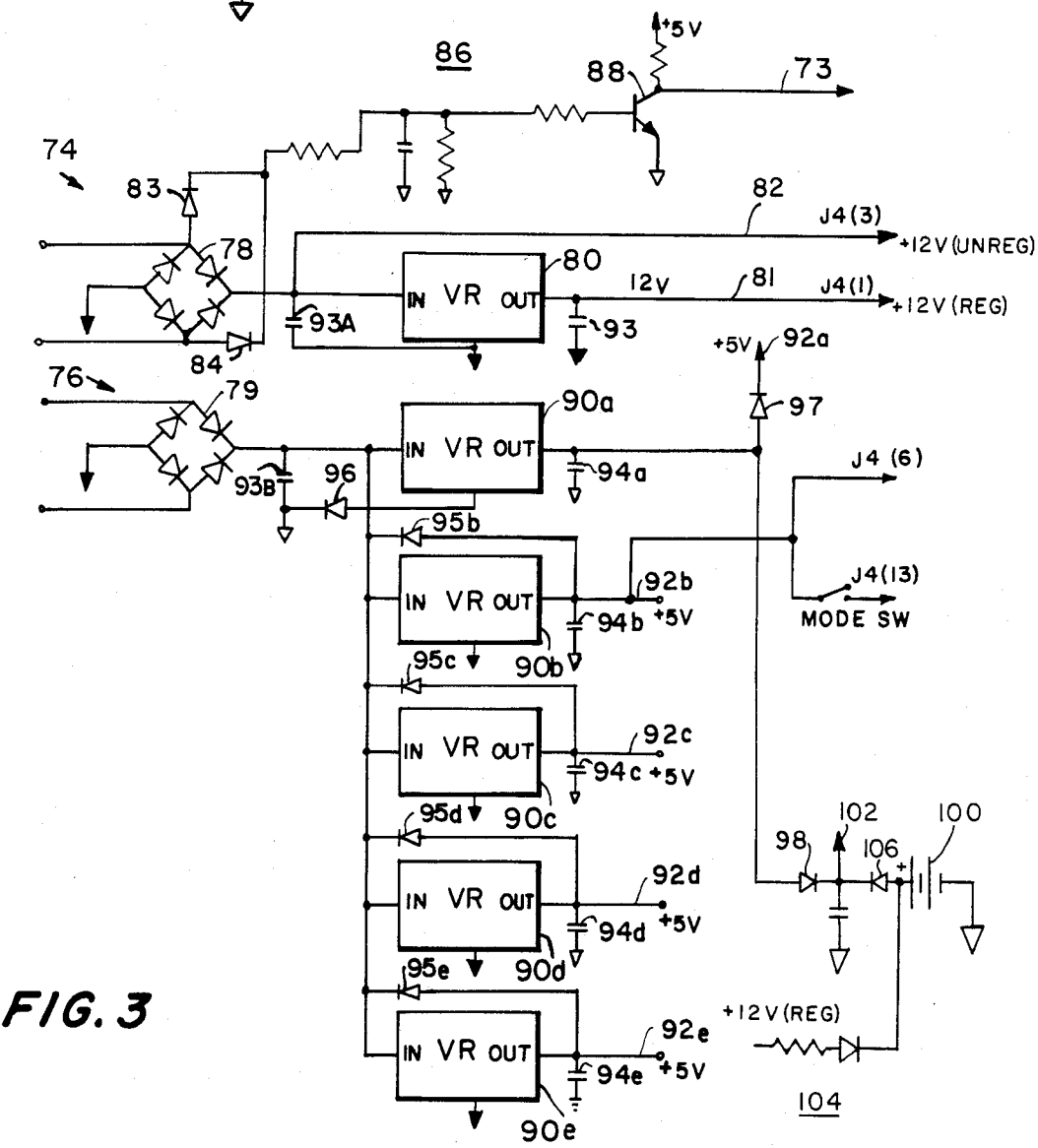
FIG. 3 shows a power supply circuit for the repertory dialer of FIG. 1.

Referring now to FIG. 3, a power supply circuit for the present repertory dialer is shown. The circuit of FIG. 3 is seen to comprise two portions. A first portion, shown generally at 74, is used to provide both regulated and unregulated 12-volt DC, as well as to provide the signal on line 73 for disabling decoder 66 in the event of a power supply malfunction. A second portion, shown generally at 76, provides five separate, and substantially independent, regulated outputs at 5 volts DC, for five components of the dialer.

The inputs to the two portions of the power supply circuit are obtained from two separate secondary windings of an input power transformer. An appropriately wound transformer is selected so that for both U.S. and European patent applications a 16.55 volt AC input is provided to first portion 74 and a 10.5 volt AC input is provided to second portion 76. The outputs of the two secondary windings (not shown) are full-wave rectified by a pair of rectifying bridges 78 and 79. A voltage regulator 80 is used to provide a regulated 12 volt DC output voltage to microprocessor 30, SMI 44 and PIO 40, as well as to the relay drivers of block 18 provided for the telephone interface 14. Both regulated and unregulated 12 volt outputs are provided from first portion 74, as shown at lines 81 and 82, respectively. These lines are provided to particular terminals of a connection jack used for interconnecting the various circuit boards.

As previously mentioned, a signal is provided by the first portion of the power supply circuit to indicate loss of AC power. Such a signal is generated by the use of a second full wave rectifier, comprised of diodes 83 and 84 which sense the output of the secondary winding provided to full wave rectifying bridge 78. Diodes 83 and 84, which are not associated with a large filter capacitor as is bridge 78, thus provide a more quickly reacting signal indicative of the AC input. Specifically, on loss of AC, the independent signal output of diodes 83 and 84 drops faster, and hence provides an earlier power loss detection than the output of bridge 78.

The full wave rectified signal provided at the junction of the cathodes of diodes 83 and 84 is filtered by a filter 86, comprising a pair of resistors and a capacitor for removing spikes and dips on the AC line. A transistor 88 is maintained in an ON condition by the output of filter 86 as long as AC power is available. The collector of transistor 88 is connected, via Battery Disable line 73, to maintain an ENABLE pin of decoder 66 at a low level, thereby enabling the decoder when AC power is available. Upon loss of AC input power, the transistor 88 stops conducting, its collector undergoes a transition to a high voltage level, and Battery Disable line 73 provides the high level disabling signal to decoder 66, thus preventing the microprocessor 30 from accessing and writing in memory 8, thereby preventing any changes in the stored name and telephone number information in that memory. Early power loss detection thus provides greater assurance of memory data integrity for power loss situations.

Second portion 76 includes a plurality of voltage regulators 90a, 90b, 90c, 90d, and 90e, for providing five separate regulated outputs at 5 volts. The five outputs, shown at 92a, 92b, 92c, 92d, and 92e each provide a separate 5 volt output to individual circuits in the repertory dialer. As seen in FIG. 3, each regulator 80 and 90a–90e is provided with an output capacitor 93 and 94a–94e, respectively. The capacitors are used further to filter the output of the regulators. Input capacitors 93a and 93b are connected at the outputs of full wave rectifying bridges 78 and 79 to provide additional filtration.

Fast discharge diodes 95b, 95c, 95d and 94e are provided at the outputs of regulators 90b ... 90e in order quickly to discharge the output of the regulators upon an AC power failure. In such a failure, as the AC Power drops and input filter capacitors 93a and 93b discharge, the input voltage to the regulators will drop below the respective output voltages. The discharge diodes begin conducting at this point, thus causing the 5 volt output voltage to drop quickly, assuring that the microprocessor will not alter the memories used to store names and telephone numbers during the power loss. The diodes thus provide an orderly power down for the microprocessor circuits. Further, a diode 96 is used to raise the output of regulator 90a by one diode drop (0.7 volts), thereby to obtain a 5.7 volt output therefrom. This increase in output voltage thus permits the use of isolating diodes 97 and 98. Diode 98 is used to prevent battery buildup voltage from feeding into the regulator upon loss of AC power. Diode 97 is used to provide improved load distribution among the 5 volt regulators.

The present power supply further provides a battery backup system for retaining the data stored in memory 8 in the event of a power failure. Specifically, a NiCd battery 100 is used to provide backup power to the output of regulator 90a on an output line 102.

The output voltage of regulator 90a with backup protection of battery 100, is used to provide the collector supply for transistor 88, as well as to supply decoder 66 and the various memory chips of memory 8. Additionally, regulator 90a provides its output, through diode 97, to one of the read only memory units in control memory 10. Battery 100 is constantly in a trickle charging condition, through a charging circuit 104 which receives an input voltage from the regulated 12 volt line 81. A diode 106 is used to block the 5 volt output of regulator 90a from entering the battery 100, thus preventing the connection of a heavy load on that regulator.

It is to be understood that diodes 98 and 106 effectively provide an isolating OR gate to line 102, such that the higher of the two voltages output by battery 100 or regulator 90a is provided to the selector 66, transistor 88, and memory 8. Thus, as long as AC power is present and regulator 90a provides the appropriate 5.7 volt output, line 102 is kept at 5 volts and battery 100 is trickle charged by circuit 104. Upon power failure, trickle charging circuit 104, which includes a diode therein, prevents battery 100 from discharging through regulator 80, and the effective OR gate formed by diodes 98 and 106 provides the output voltage of battery 100 to line 102. The backup battery 100, which provides 4.8 volts to the anode of diode 106, thus provides approximately 4.1 volts to line 102.

The use of CMOS circuits enables operation at voltages substantially lower than 4.5 volts, normally required for TTL devices. In fact, while memory 8 begins its operation in the event of a power failure at 4.1 volts, storage is effectively error free until the backup voltage drops to approximately 1.4 volts. Inasmuch as the decoder, transistor and memory circuits draw an approximate current of only two milliamperes, the backup battery continues to provide a voltage in excess of the 1.4 volt cutoff for at least three weeks of operation. It is thus seen that the contents of memory 8 of the present repertory dialer will be held intact for a substantial period of time subsequent to a power failure.

The output of regulator 90b is used to provide operating voltage to microprocessor 30, audio circuit board 4, and confidence feedback circuit 26. The output of regulator 90c is used to provide operating voltage to another of the read only memory chips in control memory 10, to multifrequency generator 20, to the latch circuit at 18, and to dial tone detection logic 25. The output of regulator 90d provides operating voltage for a portion of display circuit board 2, and to a third light emitting diode, LED 3. Thus, upon application of AC power to the repertory dialer, LED 3 is illuminated to indicate that the device is in an "ON" state. The output of voltage regulator 90e provides the operating voltage for the remainder of display board 2.

A number of local decoupling capacitors are provided for several of the integrated circuit chips in order to prevent sudden power surges in several of the components of the repertory dialer from generating spikes on the regulated five volt and 12 volt DC power line.

Figure 4:
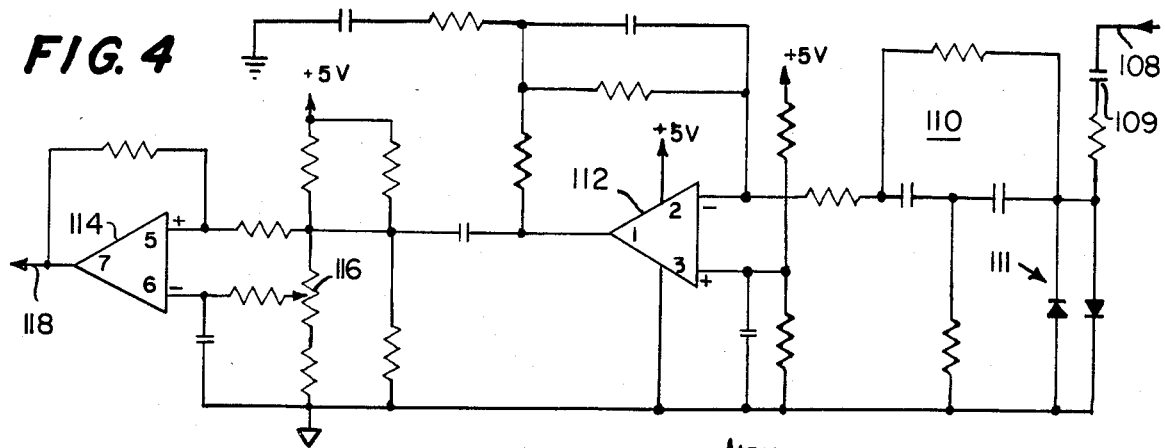
FIG. 4 shows the dial tone detection circuit portion of FIG. 1.

Referring now to FIG. 4, the dial tone detection logic shown at 25 in FIG. 1 is seen in greater detail. Operation of the circuit shown in FIG. 4 provides a square wave signal to microprocessor 30, the mircoprocessor in turn determining the frequency of the signal and assuring that the signal is present on telephone lines 16 for a predetermined time before permitting initiation of a dialing operation.

Specifically, audio signals from the telephone lines are provided through interface logic 14 on line 108. A capacitor 109 is used to block DC signals which may be present on the audio transformer circuit of the interface logic. A bridged T filter 110 selects signals in a predetermined bandwith for application to the remainder of the detection logic. A pair of clamping diodes 111 is used to prevent signals in excess of 0.6 V from entering the detection circuit. A first amplifier 112 is connected to provide a Schmitt trigger for squaring the input signals to be presented to a second amplifier operating as a threshold detector and shown at 114. A variable resistance 116 is provided at the input of the amplifier 114 in order to adjust the threshold for detection of a dial tone.

The output of amplifier 114 is thus a square wave, responsive to occurrence of signals exceeding predetermined variable threshold levels, which is provided on output line 118 to PIO 40. The square wave signals are input to PIO 40 on its interrupt request line 51 for interrupting microprocessor 30, which is programmed to stop at each cycle of the square wave and to use its internal time base to measure the frequency of interruptions and hence dial tone frequency. Additionally, once the microprocessor determines that an appropriate dial tone frequency exists on the telephone lines, programming provides for further timekeeping, so that microprocessor 30 does not begin its dialing out sequence until after passage of a predetermined period of time.

Figure 5:
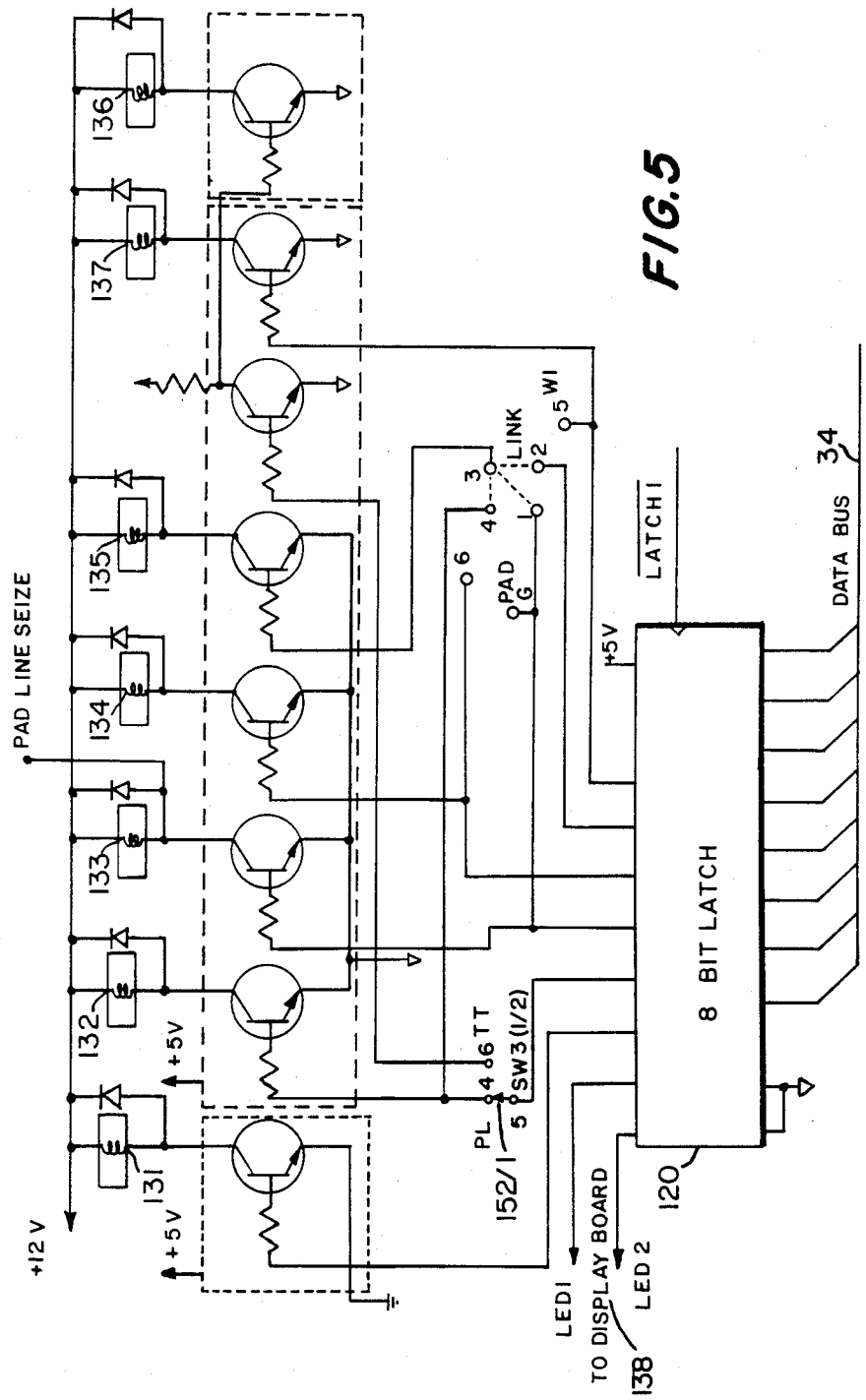
FIG. 5 shows the control latch and relay driver circuit portion of FIG. 1.
Figure 6:
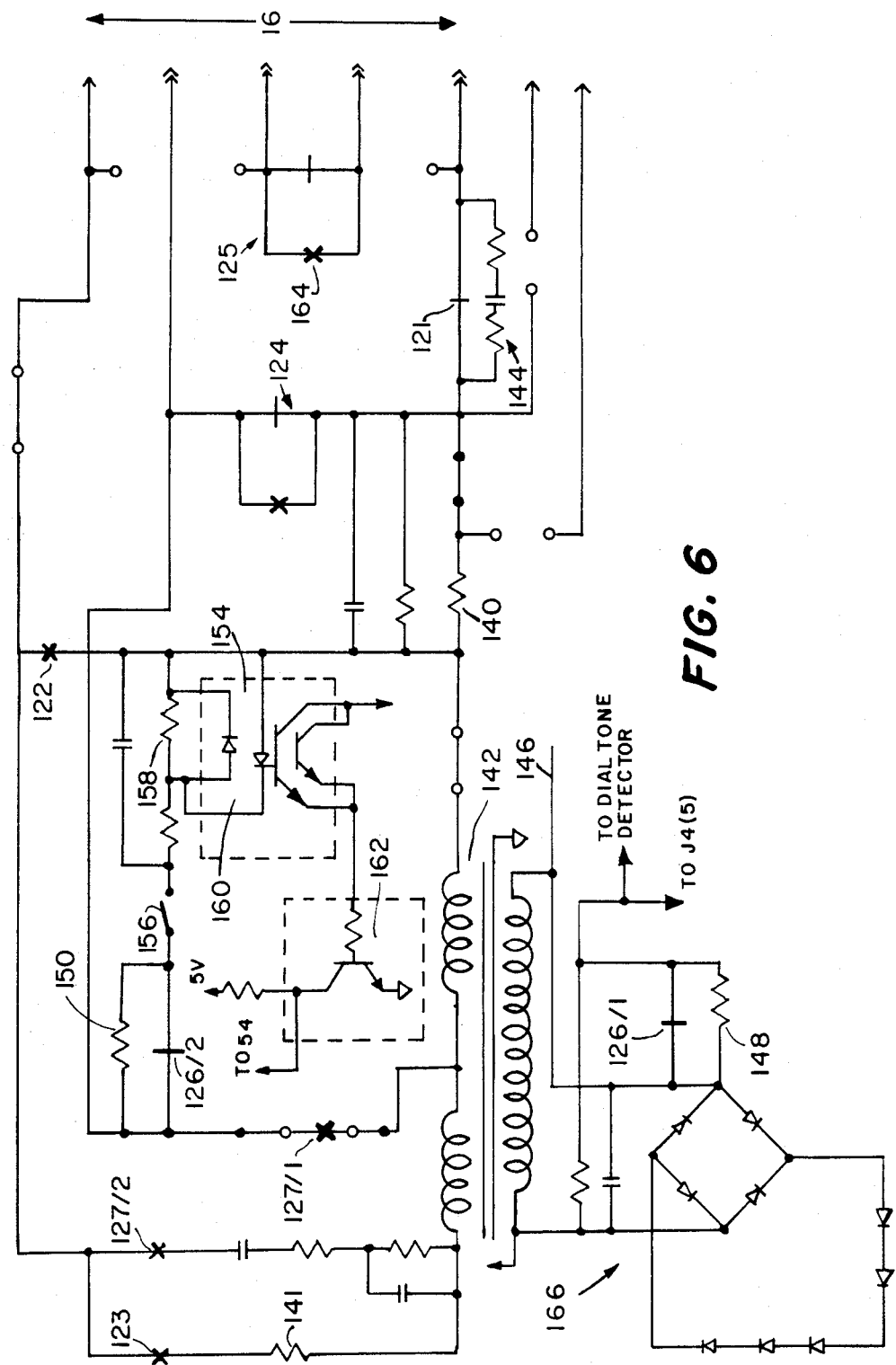
FIG. 6 shows the telephone interface circuit portion of FIG. 1.

Referring now to FIGS. 5 and 6, the control latch and relay drivers, as well as the telephone interface circuit, shown as blocks 18 and 14 in FIG. 1, are illustrated in greater detail. Specifically, a latch 120 is shown in FIG. 5 as communicating with microprocessor 30 over data bus 34. Latch 120 is used to store the appropriate states of each of a number of relays 121-127 which perform the following functions within the repertory dialer:

121—pulsing relay—the contacts of this relay open and close to pulse out digits in the dial pulse mode;
122—pulse muting relay—used to mute the speaker phone and handset while the pulsing relay is open;
123—seize 1 relay—closes the seize the telephone line and to connect the dialer thereto;
124—seize 2 relay—opens to disconnect the telephone from the telephone line;
125—auxiliary relay—used to control the lights on a multi-button office phone or to generate a ground start;
126—touch tone muting relay—used to mute the speakerphone and handset while multifrequency tones are being generated for touchtone dialing.

Relays 121-127, which are shown in FIG. 6, are energized and deenergized by coils 131 through 137, respectively, shown in FIG. 5. Latch 120 is perferably an eightbit latch, to enable storage of the required status of each of the relays in a single chip, and may be of the type designated by 74LS374, manufactured by Texas Instruments. As is further apparent from FIG. 5, relay coils 131-137 are controlled by seven transistors driven by the outputs of latch 120. Latch 120 further provides two outputs, shown at 138, to activate LED 1 and LED 2, previously described.

With reference to FIG. 6, in which a normally opened relay contact is indicated by X and a normally closed relay contact indicated by a straight vertical line segment, the relay logic circuit functions as follows. When the dialer is not being used, normally closed contacts 121 and 124 of the relay network connect the telephone to the telephone line. In order to seize the line, microprocessor 30 generates an appropriate address on the upper four bits, 68, of address bus 42 for enabling latch 120 to receive data. The microprocessor then generates a data word for transmission to latch 120 over data bus 34 in order to cause the latch to close relay contacts 123 and, ten milliseconds later, to open contact 124. The appropriate transitions in the outputs of the latch cause changes in activation status of the driving transistors for coils 134 and 133. The resulting change in the contact configuration in FIG. 6 completes a circuit through contacts 121 and 123, a pair of resistors 140 and 141, and audio transformer 142. The central office responds with a dial tone which is detected by audio transformer 142 and the dial tone detection circuit described at FIG. 4.

In order to provide pulse dialing, relay contacts 121 are opened and closed, preferably at a rate of ten pulses per second. Relay 122, which is closed by microprocessor 30 through latch 120 during the activation of the pulsing relay contact 121, is a muting relay which prevents the transmission of loud pulsing noises to the speaker 22 of the telephone set. A resistive-capacitive spark suppressing circuit 144 shunts pulse contact 121 to provide protection for the contact.

Multifrequency, or "touchtone" dialing is done through a multifrequency generator 20, available as an integrated chip of the type A4 3 9400, for example. The appropriate code is input by microprocessor 30 to seven lines of the multifrequency generator through PIO 40 on output lines 56 thereof. In a manner well known to those skilled in the art, the multifrequency generator provides dual output tones using a resonator, and proper separation in amplitude between the high and low frequencies is provided by a filter network. The generator provides its signals to the audio transformer 142 on line 146. Audio transformer 142 in turn presents the tones to the telephone line 16. Relay contacts 126 are used to mute the touchtone signals from speaker 22, which may represent the telephone handset speaker or the speaker associated with the chassis of the dialer. Muting is achieved by opening contacts 126/1, thereby inserting a resistance 148 in series with the audio signal, while contacts 126/2 open and insert a resistance 150 in series with the telephone. A switch 152, having a pair of associated contacts 152/1 shown in FIG. 5 and a separate contact set, not shown but connected directly to one of the input/output pins of port 1 of the microprocessor, is used to select pulsing or multifrequency dialing by inputing the information to the microprocessor. Contacts 152/1, as seen in FIG. 5, select the transistor for driving either the muting relay control coil 132 (for muting pulse dialing) or for controlling the relay 136 (for muting multifrequency dialing).

Off-hook conditions are detected by the present dialer apparatus using photo-optical circuitry provided on an integrated circuit chip 154. Upon removal of the handset from its cradle, current flows from telephone lines 16, passes through contacts 126/2 and an interlock switch 156 provided on the rear panel of the repertory dialer. The current further passes through resistor 158 prior to returning through resistor 140 to contact 121 and to the telephone lines. A photo-optical coupler 160 on chip 154 detects the current through resistor 158. Inasmuch as the detected signal is an AC signal, both halves of the opto-coupler integrated circuit are used. Opto-coupler 160 in turn drives a transistor 162 providing an output at its collector to the dedicated input/output line 54 for alerting microprocessor 30 to the off-hook condition. Interlock switch 156 disables the off-hook alerting feature.

Relay contacts 125 include an auxiliary contact pair 164 for providing power to illuminate the lamps of a multi-button telephone set.

Finally, the interface circuit of FIG. 6 includes a protective circuit 166 shown across the secondary winding of audio transformer 142. The protective circuit comprises a full wave rectifying bridge and a series connection of five additional diodes, thereby to limit the maximum AC signal across the transformer to seven diode drops, or to approximately 4.9 volts.

Figure 7:
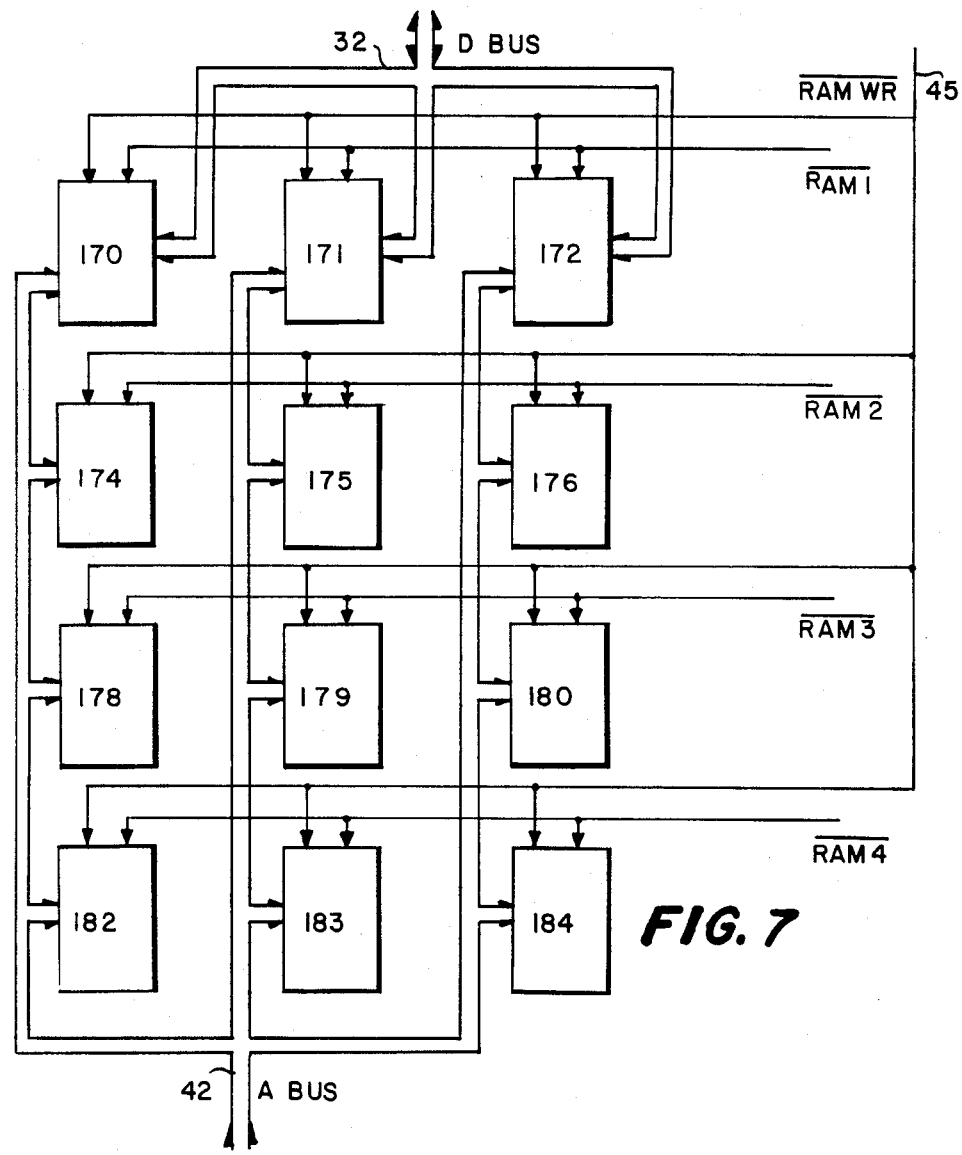
FIG. 7 illustrates one configuration of a memory as shown in FIG. 1.

FIG. 7 shows the memory configuration of memory 8 for storage of telephone numbers, names, and other pertinent data. As seen in the figure, the memory is arranged as a plurality of sets of individual memory chips. Preferably, the present memory is arranged to store data represented by octal codes, and thus includes four sets of three 4K×1 bit static RAM chips 170-172, 174-176, 178-180, and 182-184. As seen in the figure, each of the chips is addressed by address bus 42. Further, the RAM write enable signals generated by SMI 44 at line 45, is applied to each of the chips to enable writing of data therein from data bus 32. Connection to data bus 32 is symbolically shown only for chips 170-172, although it is to be understood that a similar connection is provided for each of the chips in the memory matrix.

In operation, microprocessor 30 formulates specific addresses, which are assembled by SMI 44 onto address bus 42 for accessing a specific location in memory 8. Where data is to be written into the location, the voltage level on RAM write enable line 45 is dropped, and data from data bus 32 is written in the appropriately addressed location. Alternatively, where data is to be read out of the specific location, line 45 remains at a high level and the addressed location is read out on data bus 32. The data provided by memory 8 to the data bus 32 may be provided to display 2 or to the PIO 40, for dialing by multifrequency generator 20 or by pulsing relay contacts 121 through appropriate activation of transistor 131 by latch 120. Data from keyboard 12 may be input to the memory by cooperation between microprocessor 30 and PIO 40 which together scan the keyboard as previously described.

Each of the four groups of three memory chips is selected by a different output line of decoder 66. Specifically, the lines labeled $\overline{\text{RAM 1}}$, $\overline{\text{RAM 2}}$, $\overline{\text{RAM 3}}$ or $\overline{\text{RAM 4}}$ are used to enable one of the four sets of three chips. Data representation in the present invention is such that each character in the system is represented by a two digit octal code, in which the upper (most significant) three bits are stored in one location of a particular one of the four RAM sets, and the lower (least significant) three bits are stored in a location adjacent thereto. Thus, it will be appreciated that a set of three chips having a 4K×1 organization are capable of storing 2000 two-digit octal coded characters.

In the preferred embodiment, the specific length of the field of associated data, as well as of telephone number data, is widely variable. It is seen that, for an average length of 20 characters per number entry, 100 entries are capable of storage in one set of three chips. Alternatively, if the average entry length is 40 characters, only 50 entries may be stored in one set of three chips.

A significant feature of the invention is the variability of the data fields associated with the telephone numbers, as well as of the stored telephone numbers themselves. Specifically, in the preferred embodiment, the telephone number field may be as long as 32 characters comprising telephone digits and a punctuating hyphen, while the associated data field may be as long as 94 characters, consisting of letters, numbers and punctuation marks. A maximum length of a single entry is thus preferably 126 characters. Other field and entry lengths may similarly be provided. Such variable length fields require a separation in readout so that the repertory dialer attempts to dial only data from the selected telephone number field, for example.

In order to differentiate between the telephone number field and the associated data field, the present invention, rather than causing the storage wasting entry of a separating character, provides for the microcomputer to encode the two fields differently. Thus, a particular numeric digit which may occur in the telephone number field is differently encoded from the same digit occurring in the associated data field. Accordingly, variable length fields are provided by the system without the requirement of special characters to separate the fields from one another. Each entry thus comprises two differently encoded fields: a telephone number field, in which a first code is used for the digits, for example, and an associated data field, in which a second code is used for characters which may include the same digits.

The different codes used for the different fields of an entry may be based on different coding schemes, such as BCD and octal codes, for example, or may use different coded characters of a common coding scheme. The latter approach is used in the preferred embodiment, wherein the numerals 0 through 9 are represented by octal codes '57' through '46', respectively in the associated data field, and by octal '43' and '76' through '66', respectively, in the telephone number field. The specific codes used for the particular alpha, punctuation, and numeric characters are chosen to provide a predetermined hierarchy to the characters, enabling an orderly search in a predictable sequence through the various data entries.

The preferred coding scheme used in the present invention provides a displayable code for the associated data field, in which a desired hierarchy is built in as follows: space, comma, hyphen, period, 0-9, and A-Z. One such acceptable code which conforms with the above-described encoding for the digits is shown in Table 1.

TABLE I

| ASSOCIATED DATA CODE: | SPACE | 0'77' |
|---|---|---|
| | COMMA | 0'63' |
| | HYPHEN | 0'62' |
| | PERIOD | 0'61' |
| | 0 | 0'57' |
| | 1 | 0'56' |
| | 2 | 0'55' |
| | 3 | 0'54' |
| | 4 | 0'53' |
| | 5 | 0'52' |
| | 6 | 0'51' |
| | 7 | 0'50' |
| | 8 | 0'47' |
| | 9 | 0'46' |
| | A | 0'36' |
| | B | 0'35' |
| | C | 0'34' |
| | D | 0'33' |
| | E | 0'32' |
| | F | 0'31' |

TABLE I-continued

| | |
|---|---|
| G | 0'30' |
| H | 0'27' |
| I | 0'26' |
| J | 0'25' |
| K | 0'24' |
| L | 0'23' |
| M | 0'22' |
| N | 0'21' |
| O | 0'20' |
| P | 0'17' |
| Q | 0'16' |
| R | 0'15' |
| S | 0'14' |
| T | 0'13' |
| U | 0'12' |
| V | 0'11' |
| W | 0'10' |
| X | 0'7' |
| Y | 0'6' |
| Z | 0'5' |

The telephone number field is encoded in non-displayable code, as previously described, and further includes codes for the following symbols.

| | |
|---|---|
| < | 0'41' |
| # | 0'64' |
| * | 0'65' |
| — | 0'42' |

The characters in both fields are encoded when first entered. The microcomputer is programmed to enter a "store" mode upon detection that a special key has been actuated on the keyboard. Detection of a first actuation of the "store" key is interpreted by the microcomputer to signify the beginning of the associated data field. All subsequent characters are thus encoded by the microcomputer in the displayable code. A second actuation of the "store" key is required for the computer to ascertain the termination of the associated data field and the initiation of the telephone number field. All characters entered subsequent to the second actuation of the "store" key are encoded in non-displayable code. Termination of the telephone number field and storage of the entry into memory 8 is accomplished, and detected by the microcomputer 6, by a third actuation of the "store" key.

In accordance with the encoding scheme utilized herein, the hierarchy of characters in the associated data field permits alphabetic searching. One octal code represents a number greater than or less than a second octal code. The encoding procedure utilized herein permits storage of information in an alphabetical sequence. Similarly, the information may be stored in the order received, but hierarchical alphabetical comparison may be achieved by a simple arithmetic comparison of a code entered by the user with the octal codes of all previous entries stored in memory 8. Preferably, however, a special store subroutine is used to merge any keyboard entry into the alphabetical sequence of stored entries in memory 8. The separate encoding used for the telephone number field characters, as previously described, eliminates a need for field termination characters and further simplifies the search process of finding names. That is, each alternate code type marks the beginning of another stored entry. The alternating coding schemes are thus used to differentiate between alternating associated-data and telephone-number data fields.

Figure 8:
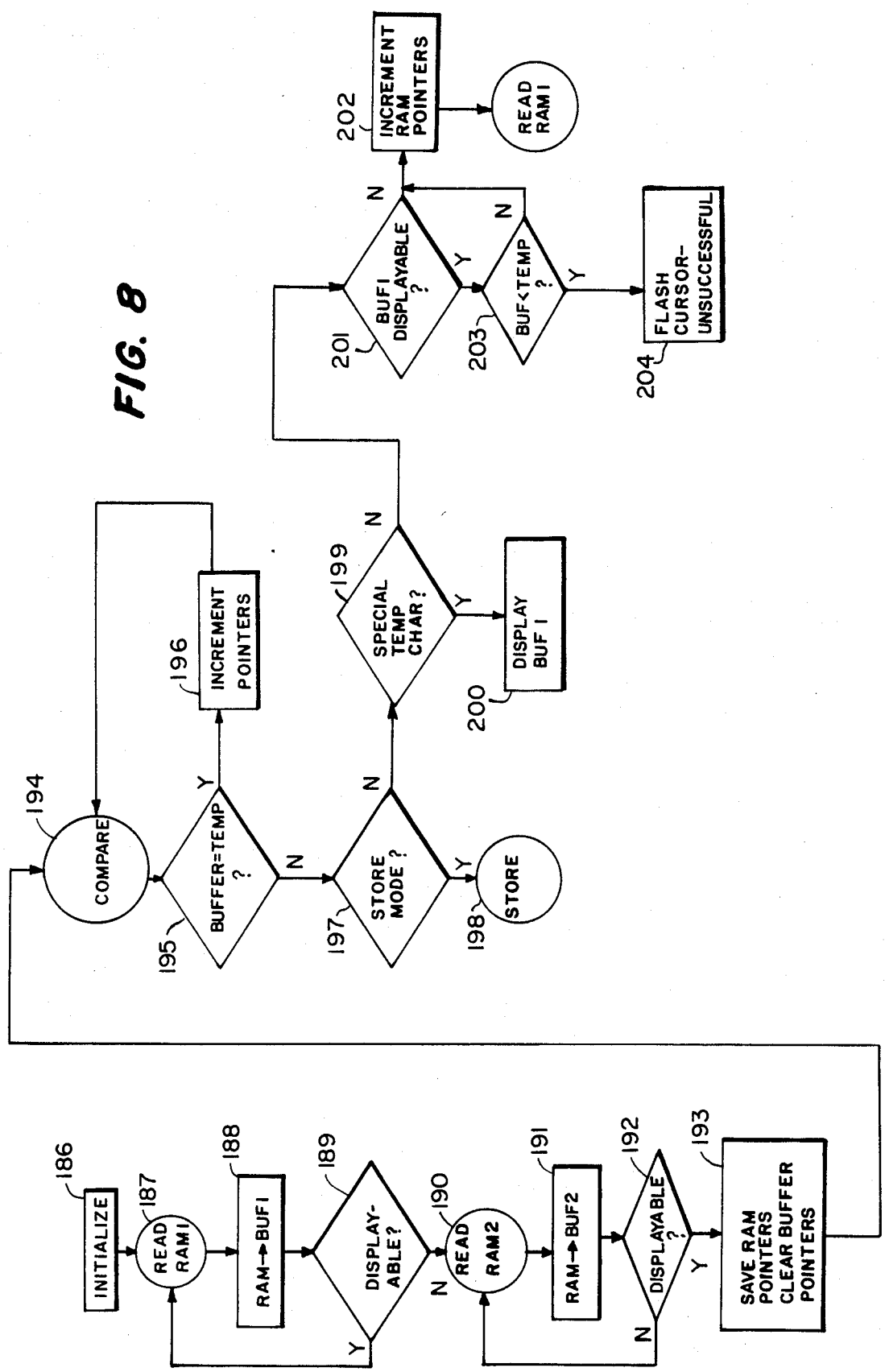
FIG. 8 shows a flow chart controlling operation of the microcomputer portion of FIG. 1.

Referring now to FIG. 8, operation of the decoding sequence used in searching the stored data for a field matching a desired entry is shown in a flow chart.

In operation, microcomputer 6 is programmed to respond to a search request by executing two reading operations for storing information from two data fields of an entry in two buffers. Thus, at step 186 the microprocessor initializes operation by setting RAM pointers to the first allowable storage location and by entering the keyboard entry into a register or other location, labeled "temp". At step 187, the contents of the storage location are read character by character. The characters are stored in buffer 1 at step 188. The characters are examined at step 189 to determine whether they are in the first or second encoding techniques. That is, if the character read by step 187 and stored by execution of step 188 is in displayable code (i.e., part of an associated-data field) the reading continues. The loop formed by steps 187, 188 and 189 is thus repeated until the entire associated-data field is read and stored in buffer BUF 1. Upon determining that the next character read is not in displayable code (i.e., forms part of the stored telephone number) a second loop, comprising steps 190, 191 and 192, is executed. This loop is thus entered to read the contents of the telephone-number field and to store the contents of that field in a second buffer, BUF 2. As long as the characters accessed in the RAM are not displayable, the loop continues to be executed. It is thus seen that data fields of variable lengths are read and stored in separate buffers. Upon accessing a character encoded in the displayable code (i.e., the first character of the next associated-data field for the next entry) a housekeeping step is carried out at 193. In step 193 the RAM pointers are saved and the buffer pointers are cleared. A subroutine is entered at 194 for searching the data stored in buffer 1 (the associated-data of the entry being examined) to determine whether it matches the entry entered by the user. At step 195 a character obtained from buffer BUF 1 is compared with a character from the temporary storage for the keyboard entry. Upon determining that the characters match, pointers for the buffer and for the temporary storage are incremented at step 196 and the loop returns to step 194.

At one point or another, the characters will not match. This may occur under several circumstances, for example: the entered characters are intended to be stored at a particular location rather than to be matched with an entry; alternatively, the comparison may successfully find a matching entry and all the characters will have been matched until an end-of-query character, or the first character, or the first character of another field, is reached; as still a further possibility, matches of several preliminary characters may have occurred, and the next character of the entry in temporary storage does not match that obtained from BUF 1. This may occur either because the keyboard entered data is lower than or higher than the stored data in terms of alphabetical ordering. If the entered data is higher than the stored data (e.g., Smith entered in keyboard being matched with Smythe obtained from RAM) then the search must be concluded to have been unsuccessful. If, however, the reverse situation occurs, in which the keyboard is lower in the hierarchy than the stored entry (e.g., Smythe entered from keyboard being matched with Smith from storage), then the search must continue.

As seen in the flow chart of FIG. 8, the above situations are each handled by the programmed microcomputer as follows. Upon first detecting that the buffer character does not match the keyboard entry, a determination is made at step 197 whether the input is intended to be stored or not. If the microcomputer has been placed in the store mode, the program exists to a store subroutine at 198. If the microcomputer has not entered the store mode, a determination is made at step 199 whether a special last character has been encountered in temporary storage. This last character may be an arbitrary character (e.g., *) required of an operator to be entered at the conclusion of an entry to be searched. If the decision made at step 199 is affirmative, that is, if every one of the keyboard entry characters has been matched, the microcomputer enters a subroutine 200 for displaying the contents of buffer 1, thereby to provide an indication of a successful match. The contents of buffer 2 may then be used to activate the automatic repertory dialing apparatus upon suitable input from the operator.

In the event that the negative decision at step 195 is not caused by occurrence of the special last character of temporary storage, the microcomputer determines at step 201 whether the character in BUF 1 is displayable. In the event that the character is non-displayable (i.e., the contents of buffer BUF 1 are shorter than the keyboard entry) the RAM pointers are incremented at 202 and the microcomputer caused again to execute step 187 where the next entry of storage 8 will be read for storage in buffers and for comparison with the keyboard entry.

If the inequality between the buffer and temporary characters coincides with a displayable character in buffer (i.e., buffer entry is not shorter than keyed entry) it must then be determined at step 203 which character is higher than which in the alphabetical hierarchy. If the character from temporary storage is higher than the character from RAM storage, the microcomputer is directed to execute a subroutine at 204, in which a cursor may be flashed, for example, to indicate an unsuccessful search. If the character from temporary storage is not greater than the character from buffer storage (recalling that the two characters are not equal as determined at step 195) then it is concluded that the appropriate entry has not yet been reached, and the microcomputer directed to increment the RAM pointers and to search the next entry in storage.

It is thus seen that different coding for different fields of an entry provides field separation in reading of the stored entries and in determination of a successful match between a keyboard entry and such a stored entry.

In the preferred embodiment, the control memory 10 is illustratively formed of a first PROM chip having a 4K capacity and a second chip having a 2K capacity, each connected to the data and the address buses in a manner known to those skilled in the art. A specific PROM chip is enabled by the output of decoder 66. Control memory 10 is used to store the program controlling operation of microprocessor 30.

The preferred embodiment includes a 16 character display, formed of four 4-character display chips, preferably of the type DL1416, which are connected to the microprocessor data and address buses. The data bus 32 is used to present an ASCII code to the display chip inputs, and the two lowest address lines A0 and A1 of address bus 42 are used to select the specific one of four characters on the chip to be changed. The specific display chip in which the character is to be changed is selected by activation of one of the four address lines A2-A5. Finally, decoder 66 outputs a low signal on its $\overline{\text{DISPLAY}}$ line to enable changing a character on the display.

Each display chip provides a display of four characters, stored in a RAM on the chip. The RAM obtains its information from the microprocessor via the data bus, and the four stored characters are multiplexed for display.

In operation, microprocessor 30 is initialized by a reset signal generated either by a manually operable switch or by application of power to an RC network. The switch and the RC network, which are not shown in the drawing, are connected to an input reset pin 206 of microprocessor 30. The RC network provides a delay to assure that the applied voltage has stabilized prior to any attempt by the microprocessor to decode and to execute instructions. A discharging diode is connected to the capacitor in the RC network providing the reset pulse to the microprocessor. The diode is appropriately poled to discharge the capacitor upon loss of AC input. The rapid discharge of the capacitor assures that upon restoration of power a proper reset pulse will be applied to the microprocessor. Thus even momentary power losses result in resetting of the microprocessor to avoid introduction of undetected errors due to such power fluctuations.

Upon application of the reset signal to the Reset pin of the microprocessor, the microprocessor is programmed to fetch and execute the first instruction in memory with the aid of SMI 44. The microprocessor outputs onto the data lines the first memory address, specifically "0". The SMI assembles the two halves of the address, and outputs the complete address on address bus 42, enabling the control memory 10 which stores the instructions for memory location 0. The control memory, in turn, outputs the contents of location zero onto data bus 34 to be read by the microprocessor. The microprocessor decodes and executes the instruction and continues in its operation.

Figure 9:
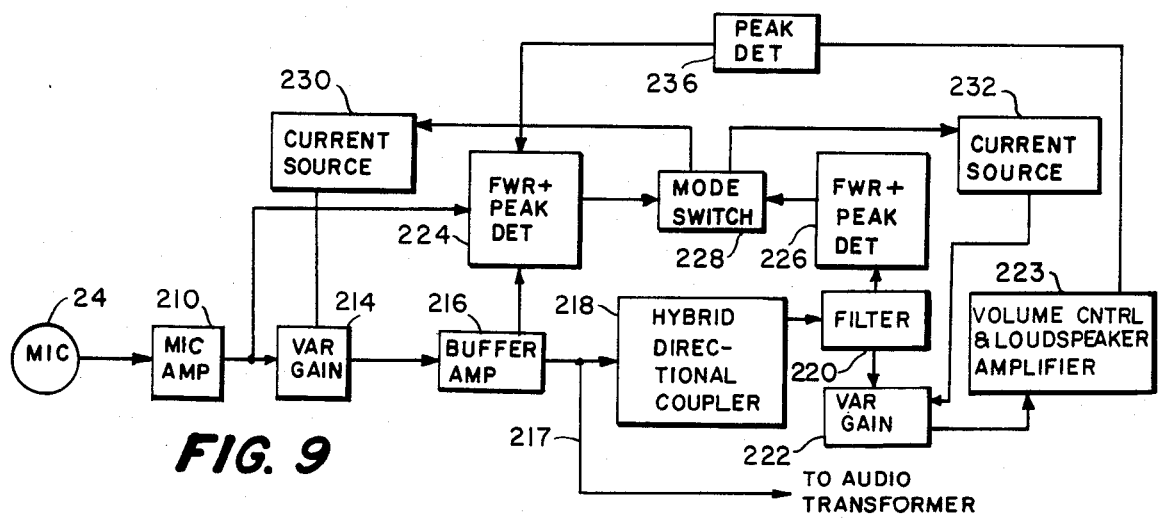
FIG. 9 shows the audio amplification control circuit of FIG. 1.

The audio amplification and control circuitry shown at 4 in FIG. 1 is illustrated in a block diagram format in FIG. 9. The audio circuit board shown in FIG. 9 is used to prevent acoustic feedback from the loudspeaker to the microphone used in conjunction with the hands-free operating feature of the present dialer.

Referring now to FIG. 9, a microphone amplifier 210 is provided for amplification of signals generated by microphone 24. The signals output by amplifier 210 are passed through a variable gain amplifier 214 to a buffer amplifier 216. The resultant audio signals are provided on a line 217 to the audio transformer 142 in FIG. 6, for connection to telephone lines 16. Alternatively, audio signals from the telephone lines are provided to the audio circuit board of FIG. 9 on line 217. In either case, audio signals either from the telephone lines or from microphone 24 are provided to a hybrid circuit, or directional coupler 218.

The directional coupler is used to cancel signals generated by microphone 24, thereby to prevent the reproduction of such signals on the speaker provided on the repertory dialer chassis. The coupler is also used to amplify audio signals provided on line 271 from transformer 142. The hybrid circuit includes a twin-T filter 220, provided to attenuate the power line signals, and a second variable gain amplifier 222, shown separately in FIG. 8. The output of the filter is passed through to a volume control and loudspeaker amplifier 223 for reproduction on speaker 22 in FIG. 1.

In order to provide appropriate directionality and switching of the signals, the circuitry of FIG. 9 includes a pair of signal detectors 224 and 226 for detecting the microphone generated audio signals and the audio signals from telephone lines 16, respectively. Each signal detector includes a full wave rectifier and a peak detector circuit. Signal detector 224 receives audio signals output by microphone amplifier 210 and buffer amplifier 216. The second signal detector circuit 226 receives signals from filter 220.

A mode switch 228 determines whether the amplifier system of FIG. 8 is operating in the transmit or receive mode. The mode switch responds to detection of audio signals in either the microphone or the telephone lines to control a pair of current sources 230 and 232 for varying the gains of variable gain amplifiers 214 and 222.

Operation of the audio circuit of FIG. 9 is described as follows. In the absence of signals from the telephone line, audio signals from microphone 24 are amplified by microphone amplifier 210. The signals output by amplifier 210 are detected by signal detector 224 and cause the mode switch 228 to generate a signal enabling a current source 230 to bias variable gain amplifier 214 into a high gain condition, thereby permitting passage of the microphone generated audio signals to buffer amplifier 216 for passage via line 217 to audio transformer 142 and thence to the telephone lines. Conversely, the second current source 232 is not enabled and variable gain device 222 is maintained in a low gain condition, thereby minimizing passage of microphone generated signals to volume control and loudspeaker amplifier 223. In the absence of microphone generated signals, signals on the telephone line, conveyed by audio line 217 to hybrid circuit 218, are amplified by an amplifier within the coupler circuit 218, filtered by filter 220 and detected by signal detector 226. Mode switch 228, in response to the detection of line audio signals, enables current source 232, placing variable gain amplifier 222 in a high gain condition and permitting passage of the received audio line signals to the loudspeaker amplifier 223. Conversely, current source 230 is disabled and any output of microphone 24 is cancelled, being blocked by variable gain amplifier 214 from passage to line 217 or to speaker amplifier 223.

Preferably, the detector circuits of units 224 and 226 and the comparator circuit used in mode switch 228 are characterized by fast response times, in order to minimize clipping of initial syllables and to permit rapid transition between the two directions of transmission. In the event that both parties speak simultaneously, the louder signal will capture the comparator within mode switch 228 and seize the corresponding amplifier channel.

Mode switch 228 includes a controlled positive feedback amplifier, bypassing a comparator amplifier therein, to provide hysteresis in its operation. That is, the comparison made by mode switch 228 results in bistable operation, so that the direction of transmission remains unchanged until one party interrupts or replies to the other. A switch may be provided to reduce the positive feedback, thereby to provide stable operation of the device in the transmit mode in the absence of any signal input.

A further peak detector 236 may be included to provide a bias input to the peak detector of signal detecting circuit 224. Peak detector 236 is connected to provide an output proportional to the loudspeaker output signal for biasing signal detector 224 to oppose the input from the microphone channel, thus further reducing interaction between the transmit and receive modes of operation.

We claim:

1. Repertory dialer comprising:
   (a) programmable microcomputer control means for controlling operation of said dialer;
   (b) dialing means in circuit with said programmable microcomputer control means for providing dialing signals to a telephone circuit;
   (c) input means for inputing telephone number data, associated search data, and control signals to said programmable microcomputer control means;
   (d) first storage means for storing said telephone number data and said associated search data:
   (e) means for enabling storage of alternating, variable length fields of said telephone number data and said associated search data in consecutive, contiguous portions of said first storage means without requiring storage of separating characters for separating said telephone number data fields from said associated search data fields;
   (f) display means responsive to said programmable microcomputer control means for displaying various data; and
   (g) second storage means, storing a control program for causing said programmable microcomputer control means to:
      (1) store said telephone number data and said associated search information data in said first storage means responsive to a first input control signal, and
      (2) access particular stored data responsive to a second input control signal and particular input search information data.

2. Repertory dialer as recited in claim 1 further comprising encoding means for encoding said telephone number data in a first code for storage in said first storage means and for encoding said associated search data in a second, different code for storage in said first storage means, whereby data from adjacent fields are differentiated by the code used therefor.

3. Repertory dialer as recited in claim 1 wherein said dialing means includes:
   relay controlled means for providing dialing signals appropriate to telephone systems responding to a particular form of dialing signal, and
   a latch circuit means, for controlling a plurality of relay drivers to provide the appropriate dialing signals, in response to signals provided thereto by said programmable microcomputer control means on said common bus means.

4. Repertory dialer as recited in claim 3 wherein said relay controlled means include first means for providing multifrequency dialing signals, and second means for providing pulse dialing signals.

5. Repertory dialer as recited in claim 4, further comprising a pair of muting means responsive to said relay drivers for appropriately muting said multifrequency or said pulse dialing signals from reproduction on a telephone or speaker associated with said repertory dialer.

6. Repertory dialer as recited in claim 3 further comprising dial tone detection means for detecting presence of a dial tone on said telephone circuit.

7. Repertory dialer as recited in claim 6 wherein said dial tone detecting means includes threshold detecting means for generating an interrupt signal for enabling said programmable microcomputer control means to determine the frequency of a signal on said telephone circuit.

8. Repertory dialer as recited in claim 3 wherein said dialing means further includes off-hook detecting means, including photo-optical signaling means therein, for detecting an off-hook condition of said repertory dialer.

9. Repertory dialer as recited in claim 1 wherein said first storage means comprises a plurality of addressable groups of random access memory units, wherein a multibit code is stored in two adjacent locations in each of the plurality of memory units.

10. Repertory dialer comprising:
   (a) programmable microcomputer control means for controlling operation of said dialer;
   (b) dialing means in circuit with said programmable microcomputer control means for providing dialing signals to a telephone circuit;
   (c) input means for inputing telephone number data, associated search data, and control signals to said programmable microcomputer control means;
   (d) first storage means for storing said telephone number data and said associated search data;
   (e) means for enabling storage of alternating, variable length fields of said telephone number data and said associated search data in consecutive, contiguous portions of said first storage means without requiring storage of separating characters for separating said telephone number data fields from said associated search data fields;
   (f) display means responsive to said programmable microcomputer control means for displaying various data;
   (g) second storage means, storing a control program for causing said programmable microcomputer control means to:
      (1) store said telephone number data and said associated search information data in said first storage means responsive to a first input control signal, and
      (2) access particular stored data responsive to a second input control signal and particular input search information data; and
   (h) common bus means connecting said programmable microcomputer control means, said first and second storage means, and said display means;
   (i) said programmable microcomputer control means comprising:
      a microprocessor connected to said input means and to said common bus means;
      an input/output port connected to said common bus means for expanding the number of control lines connectable to said microprocessor; and
      a memory interface connected to said common bus means for interfacing said microprocessor to said first and second storage means.

11. Repertory dialer as recited in claim 10 further comprising decoding means connected to said common bus means for providing selecting and enabling signals to various components and circuits of said repertory dialer.

12. Repertory dialer as recited in claim 10 wherein said input means comprises keyboard means and further comprises means for generating signals perceptable to a user, said means being responsive to detection by said microprocessor of activation of a key on said keyboard.

13. Repertory dialer comprising:
   (a) programmable microcomputer control means for controlling operation of said dialer;
   (b) dialing means in circuit with said programmable microcomputer control means for providing dialing signals to a telephone circuit;
   (c) input means for inputing telephone number data, associated search data, and control signals to said programmable microcomputer control means;
   (d) first storage means for storing said telephone number data and said associated search data;
   (e) means for enabling storage of alternating, variable length fields of said telephone number data and said associated search data in consecutive, contiguous portions of said first storage means without requiring storage of separating characters for separating said telephone number data fields from said associated search data fields;
   (f) display means responsive to said programmable microcomputer control means for displaying various data;
   (g) second storage means, storing a control program for causing said programmable microcomputer control means to:
      (1) store said telephone number data and said associated search information data in said first storage means responsive to a first input control signal, and
      (2) access particular stored data responsive to a second input control signal and particular input search information data,
   (h) common bus means connecting said programmable microcomputer control means, said first and second storage means, and said display means;
   (i) power supply means for providing operating electrical power to the several components of the repertory dialer including:
      first supply means for converting externally supplied voltage to voltages appropriate for operation of various component circuits of said repertory dialer, and
      second supply means including charging means for providing trickle charging of a rechargeable battery means and operating means for supplying operating voltage to said first storage means;
   (j) said operating means including circuit means for connecting said first supply means to said first storage means when said externally supplied voltage is available, and for connecting said battery means to said first storage means to retain data stored therein when said externally supplied voltage is not available.

14. Repertory dialer as recited in claim 13 further comprising disabling means for disabling alteration of data stored in said first storage means when said externally supplied voltage drops.

15. Repertory dialer as recited in claim 14 further comprising third supply means including voltage regulating means providing regulated operating voltage to said programmable microcomputer control means,
   wherein said disabling means includes rapid discharge means for rapidly discharging said voltage regulating means upon a drop in said externally supplied voltage.

16. Repertory dialer as recited in claim 14 wherein said programmable microcomputer control means includes decoding means for accessing said first storage means, and said disabling means includes voltage generating means for disabling said decoding means upon a drop in said externally supplied voltage.

17. A method for repertorial dialing of telephone numbers comprising the steps of:
   entering a telephone number and associated information to a microprocessor controlled repertory dialing apparatus;
   using a first coding scheme to encode said telephone number;
   using a second, different coding scheme to encode said associated information;
   storing said respectively distinctly encoded telephone number and associated information at assigned storage locations;
   entering at least a segment of associated information;
   searching for and finding a storage location having associated information stored thereat, encoded according to said second coding scheme and matching the entered segment of associated information;
   searching the found storage location for, and finding a data field encoded according to said first coding scheme; and
   generating dialing signals in accordance with data from the found data field.

18. The method of claim 17 wherein said storing step comprises the step of
   storing said respectively distinctly encoded telephone number and associated information at consecutive, contiguous, storage locations of varying lengths.

19. A method for repertorial dialing of telephone numbers comprising the steps of:
   entering a telephone number and associated information to a microprocessor controlled repertory dialing apparatus;
   using a first coding scheme to encode said telephone number;
   using a second, different coding scheme to encode said associated information;
   storing said respectively distinctly encoded telephone number and associated information at assigned storage locations;
   entering at least a segment of associated information;
   storing said entered segment and a special end of segment character in a temporary location; and
   searching for a location in the storage having associated information stored therein identically matching said entered segment of associated information, said searching step comprising the steps of:
      reading information in said second code from an entry location in storage,
      storing said information in said second code in a first buffer,
      reading data in said first code from said entry location,
      storing said data in said first code in a second buffer,
      comparing corresponding characters from said first buffer and from said temporary location for equality,
      detecting the first inequality between a pair of corresponding characters,
      determining a cause for the inequality, and
      displaying the information from said first buffer if the inequality is due to said special character from said temporary location.

20. The method of claim 19 further comprising the step of generating dialing signals in accordance with data in said second buffer when said inequality is due to said special character from said temporary location.

21. The method of claim 19 wherein said determining step further comprises the step of testing whether the character from said temporary location forms said special character, the method further including the steps of:
   testing whether the character from said first buffer is in said first or second codes if the character from said temporary location is not said special character;
   reading information in said second code from the next entry location in storage if the character from said first buffer is in said first code;
   testing a hierarchical relationship between said characters from said first buffer and from said temporary location if the character from said first buffer is in said second code;
   reading information in said second code from the next entry location in storage if a first hierarchical relationship exists between said characters from said first buffer and said temporary location; and
   terminating the searching step as unsuccessful if a second hierarchical relationship exists between said characters from said first buffer and said temporary location.

* * * * *